United States Patent
Ohtani et al.

(10) Patent No.: US 6,447,900 B1
(45) Date of Patent: Sep. 10, 2002

(54) PRESSURE-SENSITIVE ADHESIVE

(75) Inventors: Shoji Ohtani; Yasuhiro Doi; Yoshinobu Ishikawa; Toshitaka Sakuda; Kenichi Shiba, all of Wakayama (JP)

(73) Assignee: Toyo Ink Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/402,009

(22) PCT Filed: Mar. 26, 1998

(86) PCT No.: PCT/JP98/01359
§ 371 (c)(1),
(2), (4) Date: Sep. 27, 1999

(87) PCT Pub. No.: WO98/44066
PCT Pub. Date: Oct. 8, 1998

(51) Int. Cl.$^7$ ................................................ B32B 27/30
(52) U.S. Cl. ................. 428/355 AC; 526/81; 526/319; 524/804; 524/833
(58) Field of Search .................... 428/355 AC; 526/319; 524/804, 833

(56) References Cited

U.S. PATENT DOCUMENTS

| | | |
|---|---|---|
| 4,925,908 A | 5/1990 | Bernard et al. |
| 5,804,610 A * | 9/1998 | Hamer et al. ............... 522/182 |

FOREIGN PATENT DOCUMENTS

| | | |
|---|---|---|
| EP | 0130080 | 1/1985 |
| JP | 59-226076 A | 12/1984 |
| JP | 62100570 | 5/1987 |
| JP | 1-261478 A | 10/1989 |
| JP | 5- 39328 A | 2/1993 |
| JP | 7- 26218 A | 1/1995 |
| JP | 8-325309 A | 12/1996 |
| JP | 9-279113 A | 10/1997 |
| JP | 9-278837 A | 12/1997 |

OTHER PUBLICATIONS

Derwent WPI Abstract, JP 7330813 A, Derwent Dec. 19, 1995.
Derwent WPI Abstract, WO 9707174 A, Derwent Class A14; A81; G03, Feb. 27, 1997.

* cited by examiner

Primary Examiner—Robert Dawson
Assistant Examiner—Christopher M Keehan
(74) Attorney, Agent, or Firm—Birch, Stewart, Kolasch & Birch, LLP

(57) ABSTRACT

The present invention provides a pressure-sensitive adhesive having a storage modulus from $1 \times 10^5$ to $1 \times 10^6$ dyne/cm$^2$ and at a frequency of 1 Hz; and having a gel fraction of 55% or more when the storage modulus is measured at a temperature of 25° C. in dynamic viscoelasticity measurement. Its pressure-sensitive adhesive product can be obtained by the process, for example, for producing the (meth)acrylate emulsion-type pressure-sensitive adhesive which comprises adding the polymerization-initiator(s) at separate multi-steps to the present reaction system in the presence of polymerization-initiator(s) at the time of polymerizing alkyl (meth)acrylate and which comprises using a water-soluble polymerization-initiator at least one time during or after the second step of adding the polymerization-initiator(s).

14 Claims, 1 Drawing Sheet ured sufficiently. In
PRESSURE-SENSITIVE ADHESIVE

This application is the national phase under 35 U.S.C. § 371 of PCT International Application No. PCT/JP98/01359 which has an International filing date of Mar. 26, 1998, which designated the United States of America.

TECHNICAL FIELD

The present invention relates to a pressure-sensitive adhesive which is used for various labels, tapes, sheets and the like, and is excellent in quality stability, processability and storage stability, and pressure-sensitive adhesive properties such as adhesion, holding power and bonding power to a curved surface; a pressure-sensitive adhesive product; and a process for producing the same.

BACKGROUND ART

Hitherto, as a pressure-sensitive adhesive, acrylic or rubber type polymer has been used. The pressure-sensitive adhesive has, however, the following problems. Firstly, if thickness of the pressure-sensitive adhesive is not strictly controlled, at the time of coating the pressure-sensitive adhesive to a backing in the production step, the resultant products come to have very different adhesions. In the case of any acrylic pressure-sensitive adhesive, the thickness of the coated pressure-sensitive adhesive is usually controlled at about 20–25 $g/m^2$. The pressure-sensitive adhesive has a property that the larger the coated thickness becomes, the larger the adhesion becomes; and the smaller the coated thickness becomes, the smaller the adhesion becomes. For this reason, common knowledge in the prior art is that if the coated thickness varies, the adhesion of the products also varies. In order to prevent troubles occurring particularly by the fact that the coated thickness inclines to become thin, coating-makers adapt so that the pressure sensitive adhesive is coated so as to become thick by 20–30% (25–30 $g/m^2$) in the present circumstances.

However, if the layer of the pressure-sensitive adhesive becomes thick in such a way, costs rise up and productivity falls. Moreover, in various steps subsequent to the coating, the following problems occur.

Namely, a pressure-sensitive adhesive sheet is usually slit by using a rotating sharp-edged tool to cut the raw roll thereof coated with a pressure-sensitive adhesive into an appropriate width, and the sheet is die cut into an appropriate size at the time of printing. In these slit-or die-cutting procedures, the pressure-sensitive adhesive remains or adheres on the edged tool, or the pressure-sensitive adhesive spreads out and is not cut. Thus, the pressure-sensitive adhesive transfers to the product or other parts, so that the product gets dirty or the sheet is not satisfactorily cut. Such various troubles arise.

And then, concerning a tape or sheet raw-roll, in the step of storing the products, a pressure sensitive adhesive is oozed from its edge-face by its weight and/or rolling-tightening pressure. Such phenomena arise, too. Besides, concerning raw-roll products die-cut into a label form after printing, their pressure-sensitive adhesive is oozed from their backing in the same manner so that the raw-rolls adhere to each other or the labels themselves shift on release paper and get out of their proper-position. In any case, the pressure-sensitive adhesive transfers onto an actual item for sale during the step of sticking the label, so that the item itself gets dirty. During the process of affixing the labels with a machine, the adhesive tends to shift the label out of proper-position. Such troubles tend to arise more frequently in the case that the backing is a plastic film than in the case that the backing is paper.

When a pressure-sensitive adhesive is coated to have a large thickness in this way, various troubles are caused. Therefore, coating-makers take, as an adoption, that a hardening agent (crosslinking agent) is added in a larger amount to, e.g., a solvent-type pressure-sensitive adhesive so that the pressure-sensitive adhesive is made hard and its cohesion is made high. According to the method, however, its original and high adhesion is suppressed so that the real performances of pressure-sensitive adhesive are not exhibited. As a result, there arises a dilemma that the pressure-sensitive adhesive should be coated thicker and thicker.

As for an emulsion-type pressure-sensitive adhesive, holding power can be obtained if a cohesive component is added thereto. There is, however, caused a phenomenon that its adhesion is extremely lowered.

Many emulsion pressure-sensitive adhesives are produced by emulsifying-polymerizing (meth)acrylate such as butyl acrylate and 2-ethylhexyl acrylate. However, a pressure-sensitive adhesive using, as a monomer, only (meth)acrylate has insufficient holding power necessary after that a tape or the like coated with the pressure-sensitive adhesive is stuck on an adherent.

Thus, the method, which aims to raise the cohesive power of the emulsion and which improves the holding power of the emulsion, is conducted by adding a polar monomer, such as acrylic acid or adding a crosslinking monomer having two or more reactive groups, such as divinylbenzene, to (meth)acrylate and copolymerizing them. The addition of the polar monomer, however, causes a fall in the water-resistance of the pressure-sensitive adhesive, thereby resulting in such a drawback that the adhesion onto any non-polar adherent such as polyolefin is largely lowered. Moreover, when a cohesive component such as these polar monomers and these crosslinking agents is added to the pressure-sensitive adhesive, the pressure-sensitive adhesive becomes elastic so that adhesion and tackiness are largely lowered.

As the above-mentioned, conventionally, it is difficult to produce an emulsion-type pressure-sensitive adhesive having good balance of pressure-sensitive adhesive performances so as to satisfy sufficiently both properties of holding power (cohesion) and adhesion.

Besides, it is important to have sufficient bonding power to a curved surface as one of the properties of a pressure-sensitive adhesive. In the case that an adherent has a curved surface, the larger the curvature thereof is, the more easily a pressure-sensitive adhesive sheet is stripped from its edge face. In other words, there arises a so-called edge lifting phenomenon that the force of repulsion of the backing against the pressure-sensitive adhesive causes stress for stripping the pressure-sensitive adhesive sheet from the curved surface of the adherent so that the edges of the pressure-sensitive adhesive sheet are gradually lifted up with the passage of time. In the present situation, there is not known a clear theory on such bonding power to a curved surface. A trial-and-error method has been repeated in the industry. The bonding power to a curved surface, which may be referred to as edge lifting resistance, is one of the important performances required for pressure-sensitive adhesives. It should be not lacking for the quality of a final product being stuck with such a pressure-sensitive adhesive label or sheet to satisfy this bonding power sufficiently. In the present situation, however, there is insufficient bonding power to a curved surfaces by various kinds of adherents, in particular an adherent made of polyolefin type compound.

Then, JP-A 7-330813 and WO097/07174 disclose an emulsion for a pressure-sensitive adhesive, comprising 50% or more by weight of a long-chain alkyl (meth)acrylate. However, the emulsion cannot sufficiently meet the above-mentioned demands.

DISCLOSURE OF THE INVENTION

The inventors have found that the above-mentioned object can be attained by a pressure-sensitive adhesive exhibiting a specific storage modulus in dynamic viscoelasticity measurement and having a specific gel fraction. The inventors have found that the above-mentioned pressure-sensitive adhesive can be produced by a process for producing an emulsion-type pressure-sensitive adhesive in which the manner of adding a polymerization-initiator is devised.

The present invention is composed of the pressure-sensitive adhesive whose adhesion does not fall even when it is thin coated, and the present invention provides the excellent pressure-sensitive adhesive which can solve fluctuation in quality based on fluctuation in the coated thickness of the pressure-sensitive adhesive, which is excellent in slitting property and property for die-cutting into a label, a tape, a sticker or the like, and which is not oozed from its backing even at the time of being stored at high temperature in summer; and provides a pressure-sensitive adhesive product thereof.

The present invention also relates to the emulsion-type pressure-sensitive adhesive having a good balance of pressure-sensitive adhesive performances, that is, having both of high adhesion and high holding power, which are usually difficult to be compatible with each other, and exhibiting excellent bonding power to a curved surface; and relates to the process for producing the pressure-sensitive adhesive.

The pressure-sensitive adhesive of the present invention is excellent in holding power and adhesion, and has the balance of pressure-sensitive adhesive performances; and can be effectively used in various applications.

The pressure-sensitive adhesive has high adhesion performances even if the coated thickness thereof is thin, and is excellent in holding power. There are produced particles having crosslinked structure wherein its inner portion is soft but its surface is hard by multi-step polymerization in which a water-soluble polymerizing-initiator is added during or after the second step. That is, the balance of adhesion and holding power is good.

In dynamic viscoelasticity measurement, the storage modulus, measured at 25° C. and at a frequency of 1 Hz, of the pressure-sensitive adhesive of the present invention ranges preferably from $1 \times 10^5$–$1 \times 10^6$ dyne/cm$^2$, and more preferably from $1 \times 10^5$–$6 \times 10^5$ dyne/cm$^2$. The gel fraction in the pressure-sensitive adhesive is preferably 55% or more, and more preferably 60% or more.

Herein, the storage modulus can be measured by applying shear stress at a given frequency to a pressure-sensitive adhesive layer coated in a predetermined step and, if desired, heating the pressure-sensitive adhesive.

In many cases, conventional pressure-sensitive adhesives have a storage modulus of $1 \times 10^6$–$1 \times 10^7$ dyne/cm$^2$, but the inventors have found that the pressure-sensitive adhesive of the present invention has a storage modulus of about $1 \times 10^5$- about $1 \times 10^6$ dyne/cm$^2$, which is one-digit smaller than the conventional pressure-sensitive adhesives, so as to give appropriate pressure-sensitive adhesive properties.

Even if the storage modulus is $1 \times 10^6$ dyne/cm$^2$ or less, which is smaller than conventional ones, the pressure-sensitive adhesive does not become hard so as to give original adhesion of the pressure-sensitive adhesive, which is a target of the present invention.

Then, if the storage modulus is $1 \times 10^5$ dyne/cm$^2$ or more, the pressure-sensitive adhesive itself does not become excessively soft so that cohesion destruction does not occur at the time of peeling. Holding power is also improved, so that any trouble does not arise at the time of processing such as die-cutting of a pressure-sensitive adhesive sheet or at the time of storage.

Necessarily, while the storage modulus is kept within the above-mentioned range, the gel fraction in the present invention is essentially 55% or more, and preferably 60% or more. Holding power is raised by setting the gel fraction to 55% or more, so that the pressure-sensitive adhesive attains its original action.

Herein, the gel fraction means a proportion of the pressure-sensitive adhesive that is not dissolved when the adhesion is incorporated into a given solvent for the purpose of dissolution.

In the case that the gel fraction of conventional pressure-sensitive adhesives is raised to make its cohesion large, the pressure-sensitive adhesives themselves get hard so that its storage modulus is also raised. It is difficult that, for example, the storage modulus is kept below $1 \times 10^6$ dyne/cm$^2$ while the gel fraction is kept above 55%. According to the present invention, in an example of the process for producing the pressure-sensitive adhesive, which will be described later, the above-mentioned properties can have been satisfied. In other words, high holding power can be obtained while high adhesion can be kept. This makes it possible to satisfy properties as a pressure-sensitive adhesive and supply strong adhesion, even if the pressure-sensitive adhesive is thin coated, so as to give such properties as good processability and good storage stability.

In the present invention, when the ratio, at the temperature of 25 ° C., of the storage modulus measured at a frequency of 100 Hz to the storage modulus measured at a frequency of 1 Hz satisfies the following formula (1), high bonding power to a curved surface can be obtained.

$$5 < \text{storage modulus (100 Hz)/storage modulus (1 Hz)} < 30 \quad (1)$$

The boding power to a curved surface means resistance against the phenomenon (edge lift) that when a pressure-sensitive adhesive sheet product such as a label is stuck onto a curved surface of an adherent, the edges of the sheet are lifted up with the passage of time.

For evaluation, a pressure-sensitive adhesive sheet is stuck onto each of columnar rods, which have Ø of 10 to 13 mm and is made of various adherent materials, and then the state that its edge is lifted up is observed for judgement. The evaluation is usually performed by using a pressure-sensitive adhesive sheet wherein a pressure-sensitive adhesive is coated in an amount of about 20 g/m$^2$ to a film made of polyethylene terephthalate having a thickness of 50 µm.

In the present invention, it is unclear why the bonding power to a curved surface is excellent if the ratio of the storage modulus measured at a frequency of 100 Hz to the storage modulus measured at a frequency of 1 Hz is within the above-mentioned range. The bonding power to a curved surface is a property in the static state, and is a factor for evaluating the state that the edge of the pressure-sensitive adhesive sheet is gradually lifted up by static repulsion force generated when the backing of the pressure-sensitive adhesive sheet stuck onto the curved surface of the adherent is returned to the original state. Herein, the lower the storage modulus is, the softer the pressure-sensitive adhesive gets. Furthermore, a capability of following roughness in the surface of the adherent gets good. As a result, the adhesion of the pressure-sensitive adhesive would be raised. Besides, the pressure-sensitive adhesive is transformed to follow fine deformation that causes lifting-up by the repulsion force of backing. Thus, even if a little deformation arises, the interface between the pressure-sensitive adhesive and the backing or the adherent is not destructed so that the bonding power to the curved surface would be made good.

Although the storage modulus in the static state cannot be directly measured, it appears that the modulus can be presumed by extrapolating a measured dynamic viscoelasticity value toward the side of lower frequencies. That is, it is presumed that the larger the storage modulus measured at a frequency of 100 Hz compared with the storage modulus measured at a frequency of 1 Hz is (i.e., the larger the ratio (or inclination) of the storage modulus (100 Hz)/ the storage modulus (1 Hz) is), the smaller the storage modulus at the side of lower frequencies becomes. It appears that the adhesion in the static state gets larger so that resistance against edge-lifting based on that the repulsion force of backing becomes larger.

When the repulsion force of backing becomes larger, it can be presumed that the larger the value (or ratio) of the storage modulus (100 Hz)/ the storage modulus (1 Hz) is, the better the bonding power to a curved surface is. However, in reality, when the ratio exceeds 30, the adhesion at the time of release becomes small and/or tackiness falls, etc. The pressure-sensitive adhesive comes not to attain its original function.

When the pressure-sensitive adhesive satisfies the above-mentioned properties, the process for producing thereof is not restrictive, but the following process is preferable, for example.

That is; the process of adding, when alkyl (meth)acrylate is polymerized in the presence of polymerization-initiator (s), the polymerization-initiator(s) at separate multi-steps into its reaction system, and using a water-soluble polymerization-initiator at least one time during or after the second step for adding the polymerization-initiator(s).

Examples of the process for preparing (meth)acrylic emulsion include emulsion polymerization, pre-emulsion polymerization and suspension polymerization. In order to prepare the emulsion of the present invention, any one of these processes may be used.

In the present invention, the polymerization-initiator that is first added (i.e., at the first addition) may be water-soluble or oil-soluble. During or after the second step, however, a water-soluble polymerization-initiator needs to be added at least one time. In this case, the following is thought: the addition of the water-soluble polymerization-initiator causes crosslinking reaction based on pulling-out of hydrogen of acrylate or the like near the surface of emulsion particles, so as to raise the gel fraction; therefore, cohesion acts as a whole to improve the holding power of the emulsion. The polymerization-initiator acts only near the surface of the emulsion because the initiator is water-soluble. Thus, crosslinking is not caused inside the emulsion so that the emulsion is soft and the pressure-sensitive adhesive is not hard as a whole. Thus, the adhesion thereof is kept good.

From the above-mentioned standpoint, it is preferred that the water-soluble polymerization-initiator is added after reaction of the monomer advances to some degree and the particle size of the resultant is made stable. In the case that the water-soluble polymerization-initiator is used in the first step, polymerization reaction takes priority over crosslinking reaction because of a large amount of the monomer in the system so that the effect of improving cohesion is small. By adding the water-soluble polymerization-initiator during or after the second step, the gel fraction rises in the emulsion and further its molecular weight distribution widens from a low molecular weight to a high molecular weight. This fact appears to contribute to the improvement in holding power and adhesion.

It is allowable that the oil-soluble polymerization-initiator is first added and then the water-soluble polymerization-initiator is added to perform polymerization step by step.

Examples of the water-soluble polymerization-initiator include peroxide type polymerization-initiators such as t-butylhydroperoxide, potassium peroxodisulfate, ammonium peroxodisulfate; azo type polymerization-initiators; and redox polymerization-initiators, which are obtained by combining any one of these initiators with a reductant such as ascorbic acid, sodium bisulfite or iron ion. These may be used alone or in combination. As the manner of adding the polymerization-initiator in the respective steps, any manner of adding at a time, adding dropwise, and continuous adding may be used. Preferably, the water-soluble polymerization-initiator added during or after the second step, among all of the added polymerization-initiators, is a substance which is dissolved in an amount of 0.1% by weight or more, and in particularly 1% by weight or more, at the reaction temperature in water. It is preferred from the standpoint of adhesion that the amount thereof is from 0.1 to 1.0% by weight and in particular from 0.1 to 0.5% by weight of the whole charged amount.

The adding cycle (interval of additions) of the polymerization-initiators, including the first adding step, and the added amounts of the respective steps are not especially limited, and may be appropriately decided considering the initial added monomer, the polymerization manner or the like.

According to the above-mentioned process, even in alkyl (meth) acrylate having a relatively short alkyl chain, for example, butyl acrylate or 2-ethylhexyl acrylate, which has been conventionally used as alkyl (meth) acrylate for emulsion-type pressure-sensitive adhesives, its holding power and its adhesion are compatible with each other to exhibit sufficient effect. Further, in the case of using a long chain alkyl (meth) acrylate having 9 or more carbon atoms as the monomer, the addition of a small amount of the crosslinking agent causes more reduction in adhesion than in the case of using one having a short alkyl chain. For this reason, it is more effective to add the water-soluble polymerization-initiator during or after the second step.

It is preferred to obtain the (meth)acrylic emulsion by polymerizing alkyl (meth)acrylate mainly containing a long chain alkyl (meth)acrylate having a $C_9$-14 alkyl group. It is preferred to use, for example, 70% by weight or more of such a long chain alkyl (meth)acrylate which has an alkyl group having 9 to 14 carbon atoms, as a main component. Specific examples thereof include nonyl (meth)acrylate, isononyl (meth)acrylate, decyl (meth)acrylate, isodecyl (meth)acrylate, dodecyl (meth)acrylate, isododecyl (meth) acrylate, tridecyl (meth)acrylate, isotridecyl (meth)acrylate, tetradecyl (meth)acrylate and isotetradecyl (meth)acrylate. These may be used alone or in combination, or may be used with other polymerizable monomer(s).

The emulsifier used in the polymerization is not limited. However, in the case that a radical polymerizable emulsifier is used, it is more effective to add the water-soluble polymerization-initiator during or after the second step.

The radical polymerizable emulsifier/dispersant is an emulsifier having a radical polymerizable double bonding group in its molecule. An appropriate emulsifier can be selected from the standpoint of copolymerizability with the monomer, monomer-emulsifying action and dispersion stability of polymer particles, regardless of the structure of its hydrophilic group, such as a nonionic, cationic and anionic structure. The polymerizable emulsifier/dispersant is a surfactant having an allyl group, (meth)acrylate, styrene group and/or isopropenyl group as polymerizable group in its molecule. The number of carbon atoms in its hydrophobic group is preferably from 8 to 20. For example, JP-A 53-126093, JP-A 56-28208, JP-A 4-50204, JP-A 62-104802, JP-A 50-98484, JP-A 54-144317, JP-A 55-115419, JP-A 62-34947, JP-B 49-46291, JP-A 58-203960, JP-A 4-53802, JP-A 62-104802, JP-A 49-40388 and JP-A 52-134658 can be referred. These radical polymerizable emulsifiers/dispersants are used so far as the advantage of the present invention is not damaged, and are usually used in the range of 0.1 to 2.0 parts by weight per 100 parts weight of all of the monomer component.

If necessary, a tackifier or a thickener may be added. As the tackifier, any one among rosins, rosin derivatives, petroleum resins, terpene resins or the like may be used. The tackifier is usually used preferably in the range of 0.1 to 30 parts by weight per 100 parts weight of the polymer component in the emulsion. Examples of a nonionic thickener include hydroxyethylcellulose, methylcellulose, carboxymethylcellulose, polyvinyl alcohol and alkyl-modified compounds thereof. Above all, the thickener having an alkyl group, particularly alkyl-modified polyvinyl alcohol, is preferable, since it can freely cause a change in the number of carbon atoms of the alkyl group, saponification value and the like and it can easily control thickness. Usually, the nonionic thickener is preferably used in the range of 0.1 to 5.0 parts by weight per 100 parts weight of the polymer component in the emulsion. Further, it is allowable to blend the other component such as an additive such as a pH adjuster, a defoaming agent, a preservative or a pigment so far as it does not cause a fall in the pressure-sensitive adhesive performance of the emulsion-type pressure-sensitive adhesive.

In a pressure-sensitive adhesive product, the amount of its pressure-sensitive adhesive layer is preferably from 3 to 15 kg/m². The pressure-sensitive adhesive product can be produced by stacking a release sheet, the pressure-sensitive adhesive layer and backing in this order. A mono-web type pressure-sensitive adhesive sheet may be obtained by applying a release agent to the surface of the backing and then applying the pressure-sensitive adhesive to the back surface thereof.

The emulsion-type pressure-sensitive adhesive obtained by the producing process of the present invention can be produced into a pressure-sensitive adhesive product such as a pressure-sensitive adhesive sheet, tape and label by firstly directly applying the pressure-sensitive adhesive to a plastic backing, a paper backing or the like with e.g., a comma coater or a gravure coater and then drying the pressure-sensitive adhesive, or by firstly applying the pressure-sensitive adhesive to a releasing substrate, and then drying the pressure-sensitive adhesive, and secondly laminating the pressure-sensitive adhesive with a plastic backing, a paper backing or the like and transferring the pressure-sensitive adhesive. These pressure-sensitive adhesive products are excellent in quality stability * processability * storage stability, and further pressure-sensitive adhesive properties such as adhesion, holding power and bonding power to a curved surface. Thus, the pressure-sensitive adhesive product can be effectively used in various applications.

EXAMPLES

The present invention will be hereinafter described according to Examples. The invention is not however limited to these Examples. In Examples, "%" means "% by weight" unless otherwise specified. In the following Examples and Comparative Examples, average particle sizes were measured using a particle size distribution measuring device (LA-910 type) which is manufactured by Horiba Co., Ltd. And then, viscosity was measured at 23° C. under rotation of 12 rpm for 1 minute with a Brookfield viscometer (manufactured by TOKI. SANGYO. Co. Ltd.).

The holding power, adhesion, bonding power to a curved surface, Oozing Resistance, gel fraction and storage modulus of the pressure-sensitive adhesive were measured by the following methods.

(1) Holding Power

Firstly, the pressure-sensitive adhesive was coated to a polyethylene terephthalate (PET) film having a thickness of 50 μm with a coating-machine of a bar coater model (speed: 3m/min) in the manner that the coated amount would be 20 g/m² (dry). The resultant was dried at 105° C. for 3 minutes with a hot air drier to obtain a pressure-sensitive adhesive tape. Next, the pressure-sensitive adhesive tape (width: 25 mm) was stuck onto a stainless plate (mirror-finished) as an adherent in the manner that the stuck area would be 25 mm×25 mm. A load of 1 kg was weighed thereto at 80° C. and then a time until the pressure-sensitive adhesive was stripped off was measured. In the case that the pressure-sensitive adhesive was not stripped off and held for 2 hours, shift length was measured.

(2) Adhesion

A pressure-sensitive adhesive tape (width: 25 mm) having a polyethylene terephthalate backing was made up in the same manner as in the case of the holding power. A piece of the pressure-sensitive adhesive tape was stuck onto, as an adherent, high-density polyethylene (which is represented by HDPE in a table and which has the surface tension of about 32 dyne/cm) or a stainless 304 plate (which is represented by SUS304 in the table and which is #320 finished). The resultant was then allowed to stand still for one day. Thereafter, 180-degree peel strength (peel speed: 300mm/min) at 23° C. and 65% RH was measured to obtain an ordinary peel strength.

(3) Bonding to a Curved Surface

Figure 1:
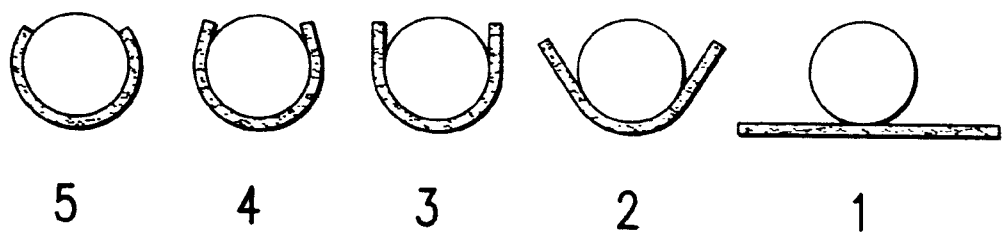
FIG. 1 is a view illustrating a test of bonding power to a curved surface.

A polyethylene terephthalate film (width: 30 mm) having a thickness of 50 μm and coated with the pressure-sensitive adhesive in the same manner that, as in the case of the holding power, was stuck onto a high-density polyethylene columnar rod which had a diameter of 10 mm, in the manner that the film covered 70% of the circumferential face. The resultant was allowed to stand still at 40° C. for 24 hours. The adhesion state thereof was observed to evaluate the state as five ranks shown in FIG. 1.

(4) Oozing Resistance

Concerning a sheet coated with the pressure-sensitive adhesive, it was evaluated by the following method whether the pressure-sensitive adhesive was or was not oozed from the edge portion of the backing by its weight or by rolling-tightening pressure.

The pressure-sensitive adhesive was coated to a polyethylene terephthalate (PET) release film having a thickness of 38 μm with a coating-machine of a bar coater model (speed: 3 m/min) in the manner that the coated amount would be 20 g/m² (dry). The resultant was dried at 105° C. for 3 minutes with a hot air drier. Next, this was stacked onto a polyethylene terephthalate film backing having a thickness of 50 μm to obtain a pressure-sensitive adhesive sheet having the release film.

This pressure-sensitive adhesive sheet was cut into pieces of a size of 10 cm×10 cm. Only the backing film was lengthwise and crosswise cut with a cutter to have a gap having a width of 1 mm so that 100 squares of 9 mm×9 mm were made. An unnecessary edge portion having a width of 1 mm was removed. The sheet having the squares was put between iron plates having a thickness of 2 mm. The resultant was pressed at 40° C. for 24 hours with a press machine in the manner that a pressure of 50 kgf/cm² was given to the sheet. Thereafter, the test piece was taken out. The oozing resistance was evaluated by the degree that the pressure-sensitive adhesive was oozed in the removed edge portion. When the pressure-sensitive adhesive was not substantially oozed, it was evaluated as A. When the pressure-sensitive adhesive was slightly oozed, it was evaluated as B. When the pressure-sensitive adhesive was oozed to cover the whole of the removed edge portion, it was evaluated as C.

(5) Gel Fraction

The gel fraction of the pressure-sensitive adhesive was measured by the following method. The pressure-sensitive adhesive was coated onto a release paper and then the resultant was dried at 105° C. for 3 minutes in a hot air dryer. Thereafter, the pressure-sensitive adhesive was stripped off from the release paper, and then was added into 100 g of a tetrahydrofuran solvent so that the concentration of the pressure-sensitive adhesive would be 1%. 200 W of Ultrasonic waves were given to this solvent for 15 minutes. Thereafter, the solution was filtered with a 200-mesh wire net to remove the pressure-sensitive adhesive which was not dissolved. The solvent, which contained to the removed pressure-sensitive adhesive on wire net, was dried, and then the weight of the pressure-sensitive adhesive was measured to obtain the gel fraction thereof.

$$\text{Gel fraction (\%)} = \frac{\text{weight of the pressure-sensitive adhesive remaining on the wire net (g)}}{\text{weight of the pressure-sensitive adhesive added to the solvent (g)}} \times 100$$

(6) Storage Modulus

Figure 2:
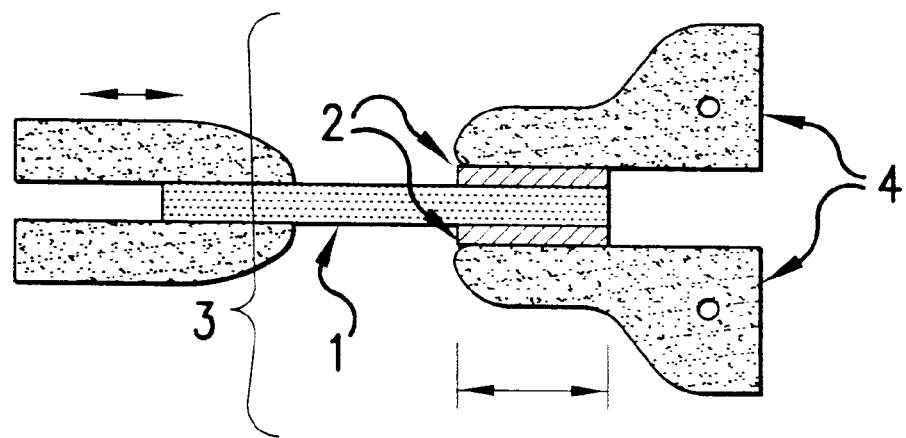
FIG. 2 is a view illustrating a test for measuring storage modulus.

The storage modulus was measured using a dynamic viscoelasticity measuring device DVA-200 (manufactured by IT Keisoku Seigyo Co., Ltd.). Samples for the measurement were prepared as follows. The pressure-sensitive adhesive was coated to the surface of a stainless plate 1 having a thickness of 1 mm, and then was dried at room temperature for not less than 3 days to form a pressure-sensitive adhesive layer 2 having a thickness of 0.3 mm. Thereafter, in the same manner a pressure-sensitive adhesive layer 2 was formed on the back face of the stainless plate, to obtain a sample 3 having on its both surfaces the pressure-sensitive adhesive layers 2 having a thickness of 0.3 mm. Next, the pressure-sensitive adhesive layers 2 were removed so that each of the pressure-sensitive adhesive layers 2 on both of the surfaces of this stainless plate 1 would have an area of 6 mm×6 mm. As shown in FIG. 2, the sample was fixed on a shear stress measuring attachment 4 in the manner that the portions of the pressure-sensitive adhesive layers 2 were sandwiched.

After the thickness of the pressure-sensitive adhesive layers 2 was measured, shear stress having a strain of 1% against the thickness and a frequency of 1 Hz was given. Measurement was made using a method of measuring dependency of dynamic viscoelasticity on temperature from −100° C. to +100° C. at a condition of temperature-rising speed of 2° C. /min. It was obtained using the storage modulus at 25° C. of the resultant measured values.

Dependency on frequency was obtained by changing the frequency between 0.1 and 10000 Hz at 25° C., to the samples obtained by the above-mentioned method, and taking the ratio of the storage modulus at a frequency of 100 Hz to the storage modulus at a frequency of 1 Hz.

Example 1

380 g of an aqueous solution of Latemul S-180 (polymerizable surfactant, made by Kao Corp.) having 2.0% as an effective component concentration were charged in a 2-liter vessel, and then 600 g of lauryl methacrylate dissolving 2.4 g of benzoyl peroxide, as a polymerization-initiator, therein were added into the vessel. The resultant mixture was treated with a Milder (made by Ebara Co.) for 20 minutes while being cooled, so as to prepare an emulsion. The average particle size of the emulsion was 0.72 μm.

This emulsion was transferred to a 2-liter reactor made of glass and equipped with a stirrer, a condenser and a nitrogen-supplying tube. The reactor was purged with nitrogen gas. And then, the emulsion was heated with stirring and was held at 85° C. for 3 hours. Next, 1.20 g of t-butylhydroperoxide dispersed in 10 g of water and 1.20 g of L-ascorbic acid dissolved in 10 g of water were added dropwise respectively, and further the reactant mixture was held for 3 hours. Thereafter, the reactant mixture was cooled and neutralized to prepare a polymer emulsion.

This polymer emulsion hardly contained aggregation, and the solid content therein was 54.6% and its average particle size was 0.70 μm.

Next, a 10%-concentration aqueous solution of X-150F (alkyl-modified polyvinyl alcohol, made by UNITIKA LTD) as thickener was added toward this polymer emulsion so that the viscosity of the emulsion would be about 4000 mPa·s. In this way, an emulsion-type pressure-sensitive adhesive was prepared.

The storage modulus and the gel fraction of this emulsion-type pressure-sensitive adhesive were measured, and this emulsion-type pressure-sensitive adhesive was coated to a PET film having a thickness of 50 μm in the manner that the coated amount after drying would be about 20 g/m². Concerning the obtained pressure-sensitive adhesive film, its adhesion, holding power, bonding power to a curved surface and oozing resistance were measured evaluated, respectively. The results are shown in Table 1.

The storage modulus and the gel fraction were within the range of the present invention. About the adhesion, holding power, bonding power to a curved surface and oozing resistance, good results were exhibited.

Example 2

530 g of an aqueous solution of Levenol WZ (an anionic surfactant, made by Kao Corp.) dissolving 1.35 g of potassium peroxodisulfate and having an effective component concentration as 2.5% were charged into a 2-liter reactor made of glass equipped with a stirrer, a condenser and a nitrogen-supplying tube. The temperature of the solution was raised up to 85 ° C. To this solution, 450 g of 2-ethylhexyl acrylate over 1 hour were dropwise added, to start polymerization. After 2 hours from the finish of the addition, 10 g of water dissolving 0.9 g of potassium peroxodisulfate were added to the solution, respectively. The reactant mixture was further held for 2 hours. Thereafter, the reactant mixture was cooled and neutralized to prepare a polymer emulsion.

This polymer emulsion hardly contained aggregation. The solid content therein was 45.2% and the average particle size thereof was 0.38 μm.

Next, Super Ester E-625 (rosin- resin- ester, made by Arakawa Chemical Industries Ltd), as a tackifier, was added to this polymer emulsion in the manner that the ester would be 10% of the emulsion solid. Furthermore, an aqueous solution of V2250 (alkyl-modified polyvinyl alcohol, made by Kuraray Co., Ltd.) having 5% of concentration was added as a tackifier thereto in the manner that the viscosity of the emulsion would be about 4000 mpa·s, to prepare an emulsion-type pressure-sensitive adhesive.

The storage modulus and the gel fraction of this emulsion-type pressure-sensitive adhesive were measured, and this emulsion-type pressure-sensitive adhesive was coated to a PET film having a thickness of 50 μm in the manner that the coated amount after drying would be about 20 g/m$^2$. Concerning the obtained pressure-sensitive adhesive film, its adhesion, holding power, bonding power to a curved surface and oozing resistance were measured evaluated, respectively. The results are shown in Table 1.

The storage modulus and the gel fraction were within the range of the present invention. About the adhesion, holding power, bonding power to a curved surface and oozing resistance, good results were exhibited.

Example 3

470 g of an aqueous solution containing Aqualon HS-20 (polymerizable surfactant, made by Dai-Ichi Kogyo Seiyaku Co., Ltd.) and having 1.5% as an effective component concentration were charged in a 2-liter vessel, and then 450 g of lauryl methacrylate, 50 g of butyl acrylate and 1.50 g of an azo-type polymerization-initiator V-59 (Wako Pure Chemicals Industries Ltd.) were added thereto. The resultant mixture was treated with an ultrasonic homogenizer (made by Nippon Seiki Co., Ltd.) for 15 minutes, so as to prepare an emulsion. The average particle size of the emulsion was 0.55 μm.

This emulsion was transferred to a 2-liter reactor made of glass and equipped with a stirrer, a condenser and a nitrogen-supplying tube. The reactor was purged with nitrogen gas, and then was heated with stirring so that the reactant was held at 85° C. for 3 hours. After 3 hours, 10 g of water dissolving 1.0 g of ammonium peroxodisulfate and 10 g of water dissolving 1.0 g of sodium bisulfate were dropwise added thereto. Further, the reactant mixture was held for 3 hours. Thereafter, the reactant mixture was cooled and neutralized to prepare a polymer emulsion.

This polymer emulsion hardly contained aggregation, and the solid content therein was 50.1% and its average particle size was 0.52 μm.

Next, a 5%-concentration aqueous solution of V2250 (alkyl-modified polyvinyl alcohol, made by Kuraray Co., Ltd.) as a thickener was added to this polymer emulsion, so that the viscosity of the emulsion would be about 4000 mpa·s. In this way, an emulsion-type pressure-sensitive adhesive was prepared.

The storage modulus and the gel fraction of this emulsion-type pressure-sensitive adhesive were measured, and this emulsion-type pressure-sensitive adhesive was coated to a PET film having a thickness of 50 μm in the manner that the coated amount after drying would be about 20 g/m$^2$. Concerning the obtained pressure-sensitive adhesive film, its adhesion, holding power, bonding power to a curved surface and oozing resistance were measured evaluated, respectively. The results are shown in Table 1.

The storage modulus and the gel fraction were within the range of the present invention. About the adhesion, holding power, bonding power to a curved surface and oozing resistance, good results were exhibited.

Example 4

The emulsion-type pressure-sensitive adhesive obtained in Example 1 was coated to a PET film having a thickness of 50 μm in the manner that the coated amount after drying would be about 13 g/m$^2$. Concerning the obtained pressure-sensitive adhesive film, its adhesion, holding power, bonding power to a curved surface and oozing resistance were measured * evaluated, respectively. The results are shown in Table 1.

As is clear from the results, even if the coated thickness of the pressure-sensitive adhesive obtained in Example 1 was made thin, about the adhesion, holding power, bonding power to a curved surface and oozing resistance, good results were exhibited.

Comparative Example 1

A polymer emulsion was obtained in the completely same conditional way in Example 1 except that, under the emulsion polymerization condition in Example 1, t-butylhydroperoxide and L-ascorbic acid, which were according to be added as polymerization-initiators in the second step, were not added.

This polymer emulsion hardly contained aggregation, and the solid content therein was 52.8% and its average particle size was 0.73 μm.

Next, in the completely same way in Example 1, a 10%-concentration aqueous solution of X-150 F (alkyl-modified polyvinyl alcohol, made by UNITIKA LTD) as a thickener was added to this polymer emulsion so that the viscosity of the emulsion would be about 4000 mPa·s. In this way, an emulsion-type pressure-sensitive adhesive was prepared.

The storage modulus and the gel fraction of this emulsion-type pressure-sensitive adhesive were measured, and this emulsion-type pressure-sensitive adhesive was coated to a PET film having a thickness of 50 μm in the manner that the coated amount after drying would be about 20 g/m$^2$. Concerning the obtained pressure-sensitive adhesive film, its adhesion, holding power, bonding power to a curved surface and oozing resistance were measured evaluated, respectively. The results are shown in Table 1.

The storage modulus (1 Hz) was within the range of the present invention. However, the gel fraction and the ratio of the storage moduli (100 Hz)/(1 Hz) were out of the range of the present invention. Then, the adhesion has no wide difference with that of Example 1, but the holding power and the oozing resistance were bad.

Comparative Example 2

A polymer emulsion was obtained in the completely same conditional way in Example 2 except that 10 g of water dispersing 0.9 g of benzoyl peroxide were used under the emulsion polymerization condition in Example 2, instead of potassium peroxodisulfate and sodium bisulfate, which were according to be added as polymerization-initiators in the second step.

This polymer emulsion hardly contained aggregation, and the solid content therein was 43.8% and its average particle size was 0.41 μm.

Next, in the completely same way in Example 2, Super Ester E-625 (rosin resin ester, made by Arakawa Chemical Industries Ltd), as a tackifier, was added to this polymer emulsion by 10% per the emulsion solid content. Furthermore, a 5%-concentration aqueous solution of V-2250 (alkyl-modified polyvinyl alcohol, made by Kuraray Co., Ltd.) was added as a thickener thereto in the manner that the viscosity of the emulsion would be about 4000 mPa·s, to prepare an emulsion-type pressure-sensitive adhesive.

The storage modulus and the gel fraction of this emulsion-type pressure-sensitive adhesive were measured, and this emulsion-type pressure-sensitive adhesive was coated to a PET film having a thickness of 50 μm in the manner that the coated amount after drying would be about 20 g/m². Concerning the obtained pressure-sensitive adhesive film, its adhesion, holding power, bonding power to a curved surface and oozing resistance were measured evaluated, respectively. The results are shown in Table 1.

The storage modulus (1 Hz), the ratio of the storage moduli (100 Hz)/(1 Hz), and the gel fraction were out of the range of the present invention. The adhesion has no wide difference with that of Example 2, but the holding power, the bonding power to a curved surface and the oozing resistance deteriorated largely.

Comparative Example 3

A polymer emulsion was obtained in the completely same conditional way in Example 2 except that, under the emulsion polymerization condition in Example 2, 2-ethylhexyl acrylate dissolving 0.9 g of divinylbenzene as a crosslinking agent was added dropwise and except that potassium peroxodisulfate and sodium bisulfite, which were according to be added as polymerization-initiators in the second step, were not added.

This polymer emulsion hardly contained aggregation, and the solid content therein was 43.6% and its average particle size was 0.39 μm.

Next, in the completely same way in Example 2, Super Ester E-625 (rosin resin ester, made by Arakawa Chemical Industries Ltd), as a tackifier, was added to this polymer emulsion by 10% per the emulsion solid content. Furthermore, a 5%-concentration aqueous solution of V-2250 (alkyl-modified polyvinyl alcohol, made by Kuraray Co., Ltd.) was added as a thickener thereto in the manner that the viscosity of the emulsion would be about 4000 mPa·s, to prepare an emulsion-type pressure-sensitive adhesive.

The storage modulus and the gel fraction of this emulsion-type pressure-sensitive adhesive were measured, and this emulsion-type pressure-sensitive adhesive was coated to a PET film having a thickness of 50 μm in the manner that the coated amount after drying would be about 20 g/m². Concerning the obtained pressure-sensitive adhesive film, its adhesion, holding power, bonding power to a curved surface and oozing resistance were measured evaluated, respectively. The results are shown in Table 1.

The gel fraction was within the range of the present invention, but the storage modulus (1 Hz) and the ratio of the storage moduli (100 Hz)/(1 Hz) were out of the range of the present invention. Concerning its performance, the holding power was good, but the adhesion was reduced to a half or less of that of Example 2. The bonding power to a curved surface was also reduced.

Comparative Example 4

The emulsion-type pressure-sensitive adhesive obtained in Comparative Example 2 was coated to a PET film having a thickness of 50 μm in the manner that the coated amount after drying would be about 15 g/m². Concerning the obtained pressure-sensitive adhesive film, its adhesion, holding power and bonding power to a curved surface were measured evaluated, respectively. The results are shown in Table 1.

As is clear from the results, the adhesion was lowered by making the coated thickness of the pressure-sensitive adhesive obtained in Comparative Example 2 thin.

TABLE 1

Examples and Comparative Examples

| | Storage modulus | | | Gel | | coated | Adhesion | | Holding | Bonding Power to a curved surface Against | |
| --- | --- | --- | --- | --- | --- | --- | --- | --- | --- | --- | --- |
| | 1 Hz | 100 Hz | ratio | fraction | Backing | amount | (gf/25 mm) | | power | HDPE | Oozing |
| | (dyn/cm²) | (dyn/cm²) | (100 Hz/1 Hz) | (%) | for coating* | (g/m²) | HDPE | SUS | (80° C., 1 kg) | (40° C., 24 hr) | resistance |
| Example 1 | 3.2 × 10⁵ | 3.8 × 10⁶ | 6.9 | 62 | PET50 | 20 | 820 | 1030 | No shift | 5 | A |
| Example 2 | 7.5 × 10⁵ | 6.0 × 10⁶ | 8.0 | 83 | PET50 | 20 | 640 | 880 | No shift | 4 | A |
| Example 3 | 5.5 × 10⁵ | 6.3 × 10⁶ | 11.5 | 72 | PET50 | 20 | 780 | 950 | No shift | 5 | A |
| Example 4 | The same as in Example 1 | | | | PET50 | 13 | 830 | 980 | No shift | 5 | A |
| Comparative Example 1 | 5.7 × 10⁵ | 3.0 × 10⁶ | 5.3 | 10 | PET50 | 20 | 800 | 990 | 25 min | 4 | C |
| Comparative Example 2 | 1.1 × 10⁶ | 5.0 × 10⁶ | 4.5 | 44 | PET50 | 20 | 610 | 800 | 1 hr | 2 | B |
| Comparative Example 3 | 2.5 × 10⁶ | 6.3 × 10⁶ | 2.5 | 95 | PET50 | 20 | 300 | 420 | No shift | 3 | A |
| Comparative Example 4 | The same as in Comparative Example 2 | | | | PET50 | 15 | 380 | 490 | 40 min | 2 | B |

*PET50: Polyethylene terephthalate having a thickness of 50 μm

What is claimed is:

1. A pressure-sensitive adhesive having a storage modulus from $1\times10^5$ to $1\times10^6$ dyne/cm², the storage modulus measured at a temperature of 25° C. and at a frequency of 1 Hz in dynamic viscoelasticity measurement; and having a gel fraction of 55% or more, wherein a ratio of the storage modulus measured at a temperature of 25° C. and at a frequency of 100 Hz to the storage modulus measured at a temperature of 25° C. and at a frequency of 1 Hz satisfies formula (1):

$$5 < \text{the storage modulus (100 Hz)/the storage modulus (1 Hz)} < 30 \quad (1).$$

2. The pressure-sensitive adhesive as claimed in claim 1, which is a (meth)acrylic emulsion pressure-sensitive adhesive.

3. The pressure-sensitive adhesive claimed in claim 2, wherein the (meth)acrylic emulsion is obtained by polymerizing alkyl (meth)acrylate comprising a long chain alkyl (meth)acrylate having a $C_{9-14}$ alkyl group, as a main component.

4. A process for producing a (meth)acrylic emulsion pressure-sensitive adhesive, which comprises:

polymerizing alkyl (meth)acrylate in the presence of polymerization-initiator(s), wherein the polymerization-initiator(s) are added at separate multi-steps to the reaction system, and a water-soluble polymerization-initiator is used at least one time during or after the second step of adding the polymerization-initiator(s) step, and the pressure-sensitive adhesive has a storage modulus from $1 \times 10^5$ to $1 \times 10^6$ dyne/cm$^2$, the storage modulus measured at a temperature of 25° C. and at a frequency of 1 Hz in dynamic viscoelasticity measurement; and having a gel fraction of 55% or more, wherein a ratio of the storage modulus measured at a temperature of 25° C. and at a frequency of 100 Hz to the storage modulus measured at a temperature of 25° C. and at a frequency of 1 Hz satisfies formula (1):

$$5 < \text{the storage modulus (100 Hz)/the storage modulus (1 Hz)} < 30 \quad (1).$$

5. The process for producing the (meth)acrylic emulsion-type pressure-sensitive adhesive claimed in claim 4, wherein the water-soluble polymerization-initiator is a redox initiator as combination of t-butylhydroperoxide and a water-soluble reductant.

6. The process for producing the (meth)acrylic emulsion-type pressure-sensitive adhesive claimed in claim 4, wherein the water-soluble polymerization-initiator is a redox initiator as combination of potassium peroxodisulfate or ammonium peroxodisulfate and a water-soluble reductant.

7. The process for producing the (meth)acrylic emulsion-type pressure-sensitive adhesive claimed in claim 4, wherein an oil-soluble polymerization-initiator is first added and subsequently the water-soluble polymerization-initiator is added to perform the polymerization step by step.

8. The process for producing the (meth)acrylic emulsion-type pressure-sensitive adhesive claimed in claim 4, wherein the alkyl (meth)acrylate comprises 70% or more by weight of a long chain alkyl (meth)acrylate having a $C_{9-14}$ alkyl group.

9. The process for producing the (meth)acrylic emulsion-type pressure-sensitive adhesive claimed in claim 4, wherein a radical polymerizable emulsifier/dispersant is used during the step of polymerizing the alkyl (meth)acrylate.

10. A pressure-sensitive adhesive product having a layer comprising the pressure-sensitive adhesive defined in claim 1.

11. The pressure-sensitive adhesive product claimed in claim 10, wherein the coated amount of the pressure-sensitive adhesive layer is from 3 to 15 g/m$^2$.

12. The pressure-sensitive adhesive product claimed in claim 10, which is a pressure-sensitive adhesive sheet obtained by stacking a release sheet, the pressure-sensitive adhesive layer and a backing in this order.

13. The pressure-sensitive adhesive product claimed in claim 10, which is a mono-web pressure-sensitive adhesive sheet obtained by laminating the pressure-sensitive adhesive layer on a surface of backing and by treating the other surface with a release agent.

14. A process for producing a (meth)acrylic emulsion pressure-sensitive adhesive, which comprises:

adding a polymerization initiator(s) at separate multi-steps into a reaction system during polymerization of alkyl (meth)acrylate;

initiating polymerization by first addition; and adding the polymerizing-initiator(s) during or after a second step after allowing the reaction to proceed, a water soluble polymerization initiator being used at least one time during or after the second step, wherein oil-soluble polymerization-initiator is first added to all amounts of the alkyl (meth)acrylate and subsequently the water-soluble polymerization-initiator is added to perform the polymerization, and the pressure-sensitive adhesive has a storage modulus from $1 \times 10^5$ to $1 \times 10^6$ dyne/cm$^2$, the storage modulus measured at a temperature of 25° C. and at a frequency of 1 Hz in dynamic viscoelasticity measurement; and having a gel fraction of 55% or more, wherein a ratio of the storage modulus measured at a temperature of 25° C. and at a frequency of 100 Hz to the storage modulus measured at a temperature of 25° C. and at a frequency of 1 Hz satisfies formula (1):

$$5 < \text{the storage modulus (100 Hz)/the storage modulus (1 Hz)} < 30 \quad (1).$$

* * * * *